(12) United States Patent
Takeda

(10) Patent No.: US 8,442,104 B2
(45) Date of Patent: May 14, 2013

(54) SIGNAL PROCESSING APPARATUS AND SIGNAL PROCESSING METHOD

(75) Inventor: Kanji Takeda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 322 days.

(21) Appl. No.: 12/788,561

(22) Filed: May 27, 2010

(65) Prior Publication Data

US 2010/0303143 A1     Dec. 2, 2010

(30) Foreign Application Priority Data

May 28, 2009 (JP) ................................. 2009-128714

(51) Int. Cl.
*H03H 7/40* (2006.01)
(52) U.S. Cl.
USPC ........... 375/232; 375/362; 375/316; 375/360; 375/375; 375/371; 375/354; 375/355
(58) Field of Classification Search .................. 375/232, 375/362, 316, 360, 373, 375, 371, 354, 355
See application file for complete search history.

(56) References Cited

U.S. PATENT DOCUMENTS

| | | | |
|---|---|---|---|
| 7,176,721 B2 | 2/2007 | Ho et al. | |
| 7,254,345 B2* | 8/2007 | Suzaki et al. ................. | 398/202 |
| 7,715,471 B2 | 5/2010 | Werner et al. | |
| 2002/0163960 A1* | 11/2002 | Blodgett et al. ............... | 375/232 |
| 2005/0157780 A1 | 7/2005 | Werner et al. | |
| 2007/0047680 A1* | 3/2007 | Okamura ....................... | 375/348 |
| 2008/0019435 A1* | 1/2008 | Chou .............................. | 375/232 |
| 2008/0080611 A1* | 4/2008 | Mobin et al. .................. | 375/233 |
| 2008/0247452 A1* | 10/2008 | Lee ................................ | 375/232 |
| 2010/0020858 A1* | 1/2010 | Suwada ......................... | 375/224 |
| 2010/0086017 A1* | 4/2010 | Shumarayev et al. ......... | 375/232 |
| 2010/0172400 A1* | 7/2010 | Chou ............................. | 375/232 |

FOREIGN PATENT DOCUMENTS

JP      2007-515130      6/2007

OTHER PUBLICATIONS

Friedel Gerfers et al.—A 0.2-2 Gb/s 6x OSR Receiver using a Digitally Self-Adaptive Equalizer—IEEE Journal of Solid-State Circuits. vol. 43 No. 6, Jun. 2008—pp. 1-13.

* cited by examiner

Primary Examiner — Siu Lee
(74) Attorney, Agent, or Firm — Young & Thompson

(57) ABSTRACT

Provided is a signal processing apparatus including: an equalizer circuit that amplifies a predetermined frequency band of an input signal and outputs an output signal; a sampler circuit that samples the output signal amplified by the equalizer circuit with the output signal being offset in an amplitude direction using a multiphase clock system; an area information calculation circuit that calculates area information of an eye opening in an eye diagram of the output signal based on the output signal sampled by the sampler circuit; and a control circuit that controls amplification of the equalizer circuit based on the area information of the eye opening calculated by the area information calculation circuit.

6 Claims, 20 Drawing Sheets

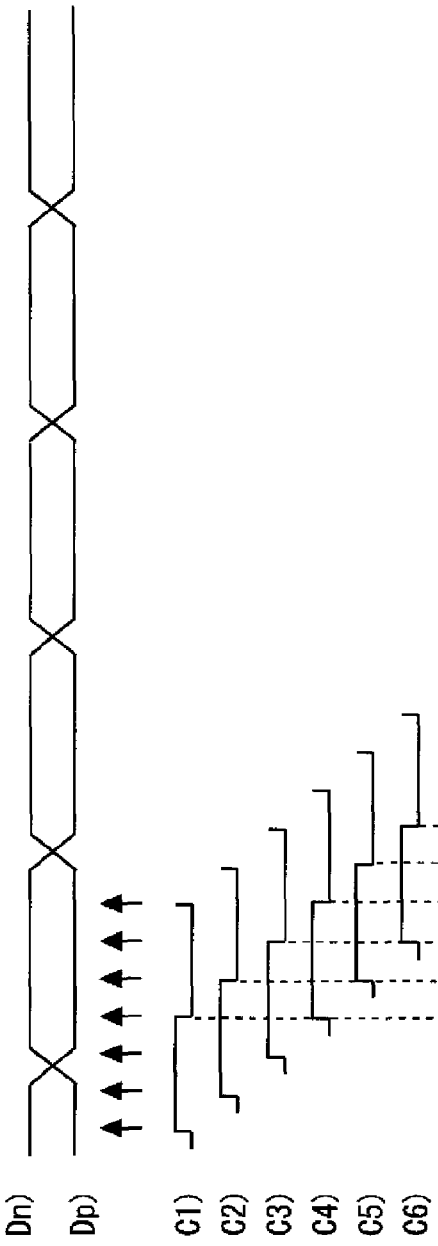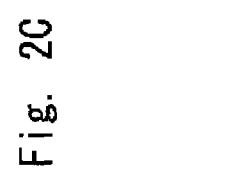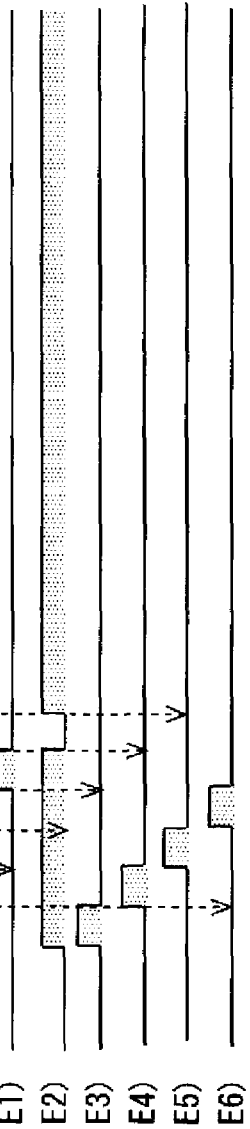

EYE DIAGRAM

EDGE WIDTH

SIGNAL PROCESSING APPARATUS AND SIGNAL PROCESSING METHOD

INCORPORATION BY REFERENCE

This application is based upon and claims the benefit of priority from Japanese patent application No. 2009-128714, filed on May 28, 2009, the disclosure of which is incorporated herein in its entirety by reference.

BACKGROUND

1. Field of the Invention

The present invention relates to a signal processing apparatus, a signal processing method, and a signal processing program that are capable of optimizing an eye opening in an eye diagram of a predetermined signal with high precision.

2. Description of Related Art

In the case of high-speed serial signal transmission, for example, frequency attenuation characteristics of a transmitter or a transmission path may cause a reduction in the area of an eye opening in an eye diagram on a receiver side. For this reason, the receiver is configured to be able to receive data using a function (equalizer function) of widening the eye opening, which is narrowed due to the attenuation characteristics, by using a peaking amplifier or the like. The amount of attenuation varies depending on the characteristics of the transmitter and transmission environments (such as characteristics of a cable). Thus, it is necessary to employ, for example, an adaptive equalizer circuit that detects the amount of attenuation of a transmission path and automatically adjusts the peaking characteristics of an equalizer according to the detected amount of attenuation.

Meanwhile, there is known an adaptive equalizer circuit that detects horizontal jitter characteristics of an eye opening on a receiver side by using a multiphase clock system, to thereby detect the amount of attenuation of a transmission path (e.g., see F. Gerfers et al., "A 0.2-2 Gb/s 6× OSR Receiver Using a Digitally Self-Adaptive Equalizer", IEEE Journal of Solid-State Circuits, Vol. 43, NO. 6, June 2008). In the adaptive equalizer circuit, a sampler circuit samples an input signal using a six-phase clock system, and performs an exclusive-OR operation on adjacent items of sampled data. Further, in the adaptive equalizer circuit, a counter circuit counts the number of values "1" obtained by the exclusive-OR operation, and a control circuit sums up the numbers of values "1" counted by the counter circuit. Thus, the horizontal jitter characteristics can be detected.

For example, when the eye opening is closed as shown in FIG. 13A, the edge width is large in the count results of the numbers "1" as shown in FIG. 13B. Meanwhile, when the eye opening is opened as shown in FIG. 14A, the edge width is small in the count results of the numbers "1" as shown in FIG. 14B. In this manner, the adaptive equalizer circuit detects the edge width for each amplification level of the equalizer, selects an amplification level of the equalizer at which the edge width is smallest, and fixes the selected amplification level.

SUMMARY

The present inventor has found a problem as follows. In the technique disclosed in F. Gerfers et al., an eye opening is detected in one direction (horizontal direction). Thus, in the case of high-speed signal transmission, for example, a skew variation between multiphase clock signals becomes large. This causes difficulty in circuit design and in optimizing the eye opening with high precision. Also in a technique disclosed in Published Japanese Translation of PCT International Publication for Patent Application, No. 2007-515130, an eye opening is detected in one direction (vertical direction), which may cause difficulty in optimizing the eye opening with high precision.

A first exemplary aspect of the present invention is a signal processing apparatus including: equalizer means that amplifies a predetermined frequency band of an input signal and outputs an output signal; sampler means that samples the output signal amplified by the equalizer means with the output signal being offset in an amplitude direction using a multiphase clock system; area information calculation means that calculates area information of an eye opening in an eye diagram of the output signal based on the output signal sampled by the sampler means; and control means that controls amplification of the equalizer means based on the area information of the eye opening calculated by the area information calculation means.

A second exemplary aspect of the present invention is a signal processing method including: amplifying a predetermined frequency band of an input signal and outputting an output signal; sampling the amplified output signal with the output signal being offset in an amplitude direction using a multiphase clock system; calculating area information of an eye opening in an eye diagram of the output signal based on the sampled output signal; and controlling the amplification based on the calculated area information of the eye opening. According to the second exemplary aspect of the present invention, the use of the area information of the eye opening in the eye diagram of the output signal makes it possible to optimize the eye opening with high precision.

A third exemplary aspect of the present invention is a signal processing apparatus comprising: an equalizer circuit that amplifies a predetermined frequency band of an input signal and outputs an output signal; a sampler circuit that samples the output signal amplified by the equalizer circuit with the output signal being offset in an amplitude direction using a multiphase clock system; an area information calculation circuit that calculates area information of an eye opening in an eye diagram of the output signal based on the output signal sampled by the sampler circuit; and a control circuit that controls amplification of the equalizer circuit based on the area information of the eye opening calculated by the area information calculation circuit.

According to exemplary aspects of the present invention, it is possible to provide a signal processing apparatus, a signal processing method, and a signal processing program that are capable of optimizing an eye opening in an eye diagram of a predetermined signal with high precision.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 2A is a diagram showing exemplary output signals output from an equalizer circuit;

FIG. 2B is a diagram showing exemplary clock signals input to flip-flop circuits;

FIG. 2C is a diagram showing exemplary output signals output from the flip-flop circuits;

FIG. 2D is a diagram showing exemplary output signals output from EX-OR circuits;

DETAILED DESCRIPTION OF THE EXEMPLARY EMBODIMENTS

Figure 1:
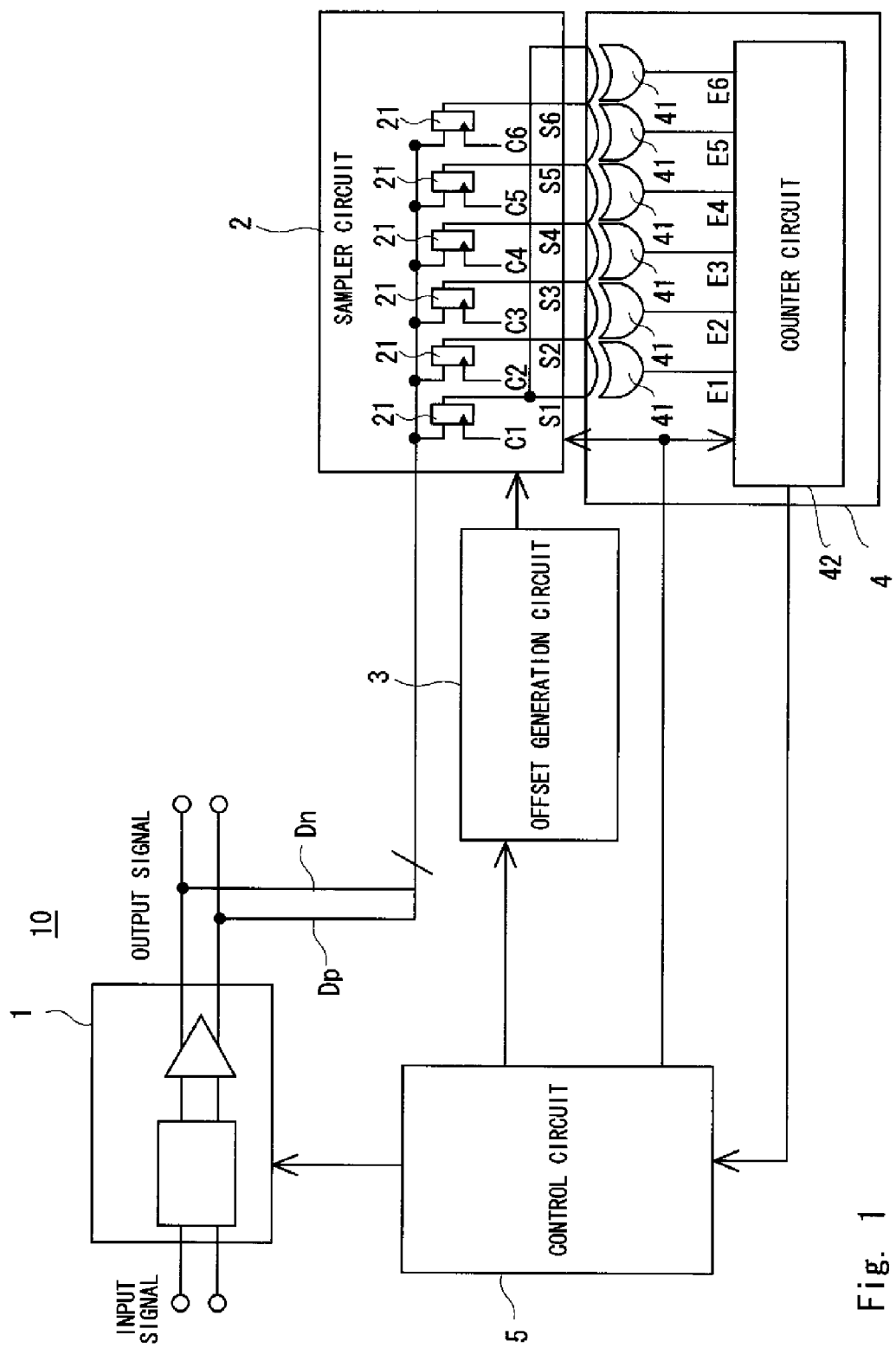
FIG. 1 is a block diagram showing a schematic system configuration of a signal processing apparatus according to an exemplary embodiment of the present invention.

Exemplary embodiments of the present invention will be described below with reference to the accompanying drawings. FIG. 1 is a block diagram showing a schematic system configuration of a signal processing apparatus according to an exemplary embodiment of the present invention. A signal processing apparatus 10 according to this exemplary embodiment includes an equalizer circuit 1, a sampler circuit 2, an offset generation circuit 3, an area information calculation circuit 4, and a control circuit 5.

The equalizer circuit 1 amplifies a predetermined frequency band of an input signal, such as a high-speed serial signal, by using a peaking amplifier or the like, and outputs the amplified signal as an output signal (predetermined signal). The equalizer circuit 1 outputs the output signal (e.g., Dn and Dp of FIG. 2A) which is amplified at one to six levels. The amplification levels of the equalizer circuit 1 are not limited to the six levels, and the number of amplification levels may be arbitrarily set. The number of amplification levels of the equalizer circuit 1 is optimally set with due consideration given to the transfer rate of the input signal (about 3.4 Gbps or more), the precision for detecting an eye opening (about 60 ps or less), and costs, for example.

The equalizer circuit 1 is connected with the control circuit 5. The equalizer circuit 1 can amplify the input signal in a plurality of levels in response to a control signal (equalizer set value) from the control circuit 5. The output side of the equalizer circuit 1 is connected to the sampler circuit 2.

The sampler circuit 2 samples the output signal, which is output from the equalizer circuit 1, with the output signal being offset stepwise in the amplitude direction using a multiphase clock system. The sampler circuit 2 samples the output signal from the equalizer circuit 1 by using a six-phase clock system (0°, 60°, 120°, 180°, 240°, 300°). Further, the sampler circuit 2 samples the output signal from the equalizer circuit 1 with the output signal being offset stepwise (e.g., at seven levels) in the amplitude direction (voltage direction) in response to an offset signal (offset value) output from the offset generation circuit 3.

While the sampler circuit 2 uses the six-phase clock system, the number of phases of the clock system is not limited to six. A clock system with an arbitrary number of phases may be used. While the sampler circuit 2 offsets the output signal at seven levels, the number of levels is not limited to seven. The output signal may be offset at an arbitrary number of levels. The number of phases of clock signals and the number of offset levels are optimally set with due consideration given to the transfer rate of the input signal, the precision for detecting an eye opening, and costs, for example.

In the sampler circuit 2, six flip-flop circuits 21 are arranged in parallel. The flip-flop circuits 21 are the six-phase clock system, i.e., synchronous with clock signals (e.g., C1 to C6 of FIG. 2B) having a phase difference of 60° therebetween, and sample the output signal from the equalizer circuit 1. While the six flip-flop circuits 21 are provided in the sampler circuit 2, the number of the flip-flop circuits 21 to be provided may be arbitrarily determined. The sampler circuit 2 is connected to the area information calculation circuit 4.

The offset generation circuit 3 is connected to the control circuit 5 and to the sampler circuit 2, and outputs the offset signal to the sampler circuit 2 in response to the control signal from the control circuit 5.

The area information calculation circuit 4 calculates area information of an eye opening in an eye diagram of the output signal from the equalizer circuit 1, based on an output signal ("0" or "1") output from each of the flip-flop circuits 21 of the sampler circuit 2.

The area information calculation circuit 4 includes six exclusive-OR circuits (EX-OR circuits) 41, which are connected to the respective flip-flop circuits 21 provided in the sampler circuit 2, and a counter circuit 42 connected to each of the EX-OR circuits 41. While the area information calculation circuit 4 includes the six EX-OR circuits 41, the number of the EX-OR circuits 41 is not limited to six. The number of the EX-OR circuits 41 that constitute the area information calculation circuit 4 may be arbitrarily determined.

Each of the EX-OR circuits 41 performs an exclusive-OR operation using two output signals (e.g., S1 to S6 of FIG. 2C) output from two adjacent flip-flop circuits 21. Then, each of the EX-OR circuits 41 outputs an operation value "0" or "1" (e.g., E1 to E6 of FIG. 2D), which is obtained by the exclusive-OR operation, to the counter circuit 42.

The counter circuit 42 counts the number of operation values "1" output from the EX-OR circuits 41, for each of the six EX-OR circuits 41. Further, the counter circuit 42 counts the number of the operation values "1" output from the EX-OR circuits 41, for each of seven offset levels (offset values=−3, −2, −1, 0, 1, 2, 3), thereby calculating 7×6 matrix information (hereinafter, referred to as "matrix information").

Furthermore, the counter circuit 42 counts the number of the operation values "1" output from the EX-OR circuits 41, by a predetermined number of clocks (e.g., 4098). Then, the counter circuit 42 recognizes that a data transition edge is present when the number of the operation values "1" is equal to or greater than a threshold S (e.g., 32), and sets "1" (first predetermined value) to an element corresponding to the matrix information. Meanwhile, the counter circuit 42 recognizes that no data transition occurs when the number of the operation values "1" is less than the threshold S, and sets "0" (second predetermined value) to an element corresponding to the matrix information. The counter circuit 42 may set "0" to an element of the matrix information when the number of the operation values "1" is equal to or greater than the threshold S, and may set "1" to an element of the matrix information when the number of the operation values "1" is less than the threshold S.

Figure 3A:
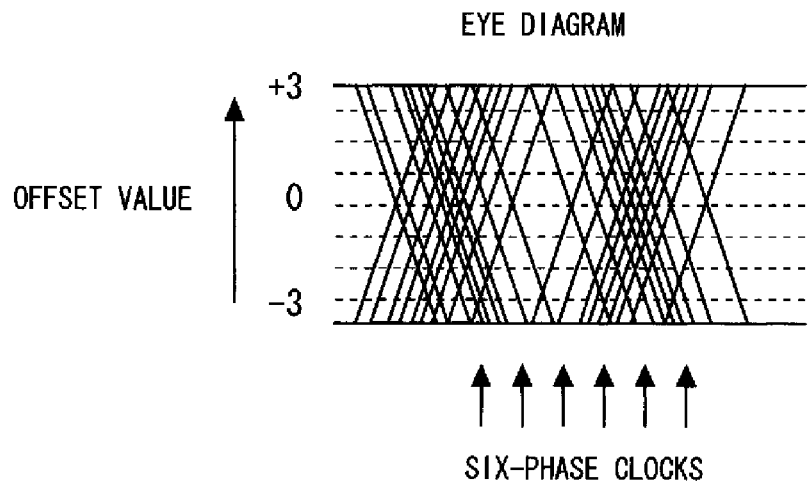
FIG. 3A is a diagram showing an exemplary eye opening in an eye diagram of the output signal from the equalizer circuit.
Figure 3B:
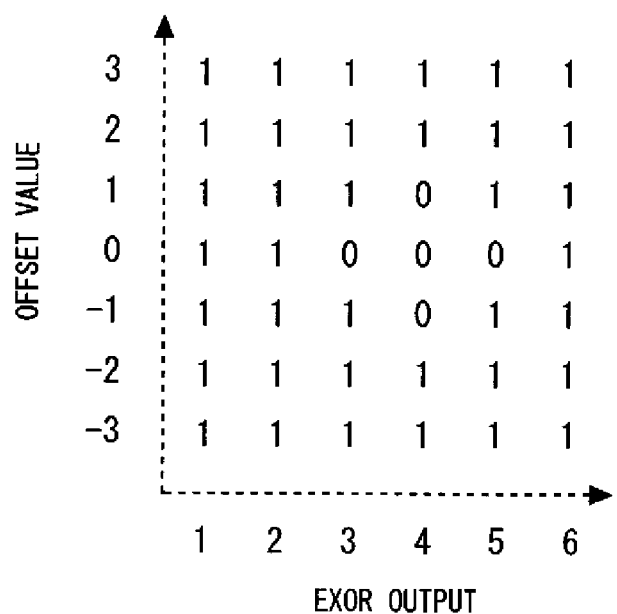
FIG. 3B is a diagram showing exemplary matrix information of the eye opening in the eye diagram of the output signal from the equalizer circuit.
Figure 4A:
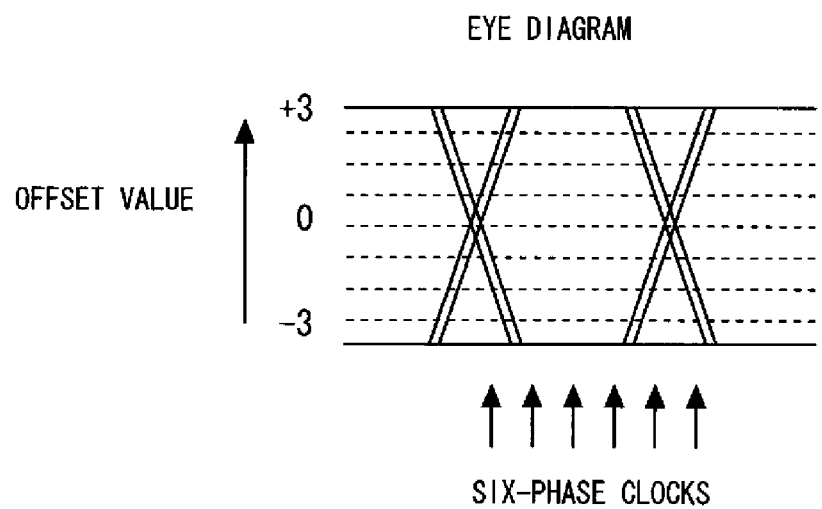
FIG. 4A is a diagram showing an exemplary eye opening in the eye diagram of the output signal from the equalizer circuit.

As shown in FIG. 3A, for example, when the eye opening in the eye diagram of the output signal from the equalizer circuit 1 is closed and when the area of the eye opening (hereinafter, referred to as "eye opening area") is small, the counter circuit 42 carries out the operation as described above and calculates matrix information as shown in FIG. 3B. Meanwhile, as shown in FIG. 4A, when the eye opening in the eye diagram of the output signal from the equalizer circuit 1 is opened and when the eye opening area is large, the counter circuit 42 carries out the operation as described above and calculates matrix information as shown in FIG. 4B.

Figure 4B:
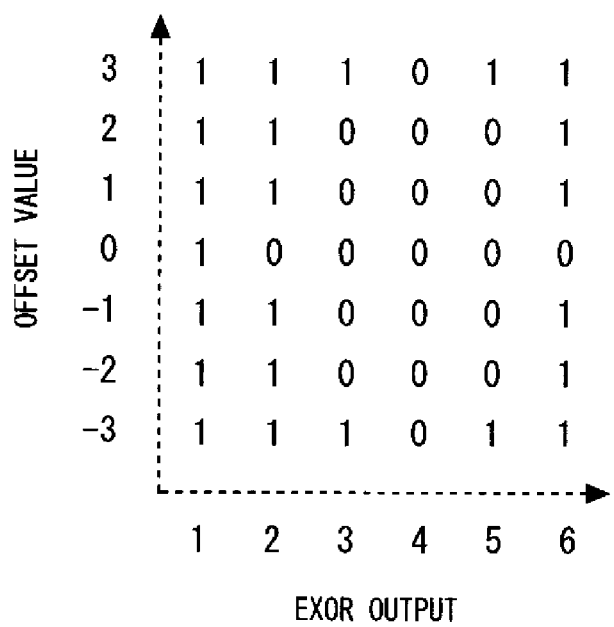
FIG. 4B is a diagram showing exemplary matrix information of the eye opening in the eye diagram of the output signal from the equalizer circuit.
Figure 5A:
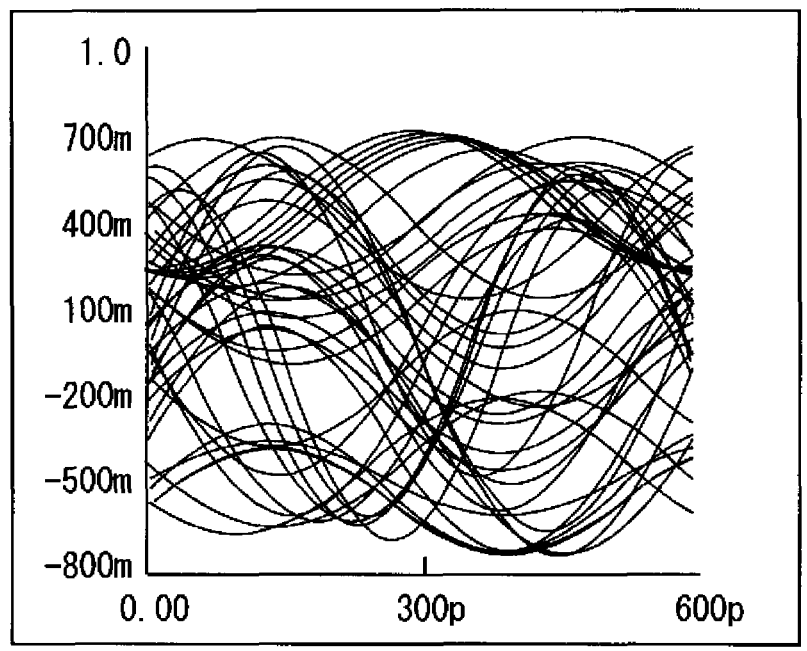
FIG. 5A is a diagram showing an eye opening when the equalizer circuit performs amplification at one level.
Figure 5B:
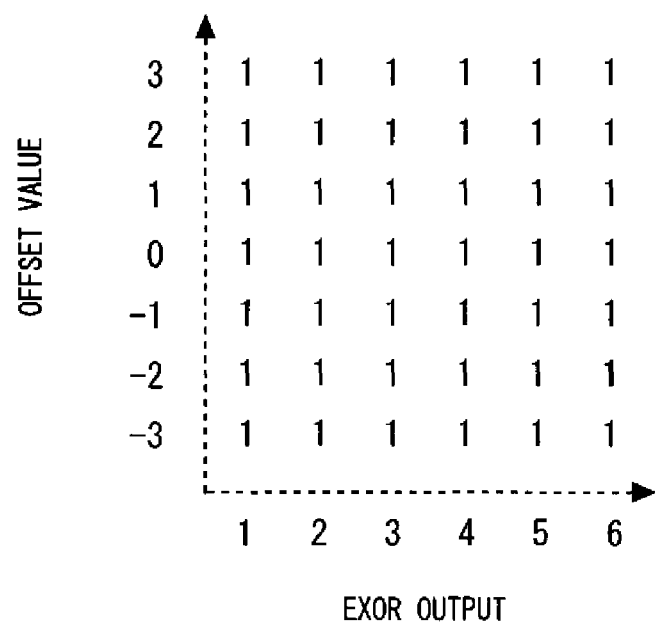
FIG. 5B is a diagram showing matrix information of the eye opening when the equalizer circuit performs amplification at one level.
Figure 6A:
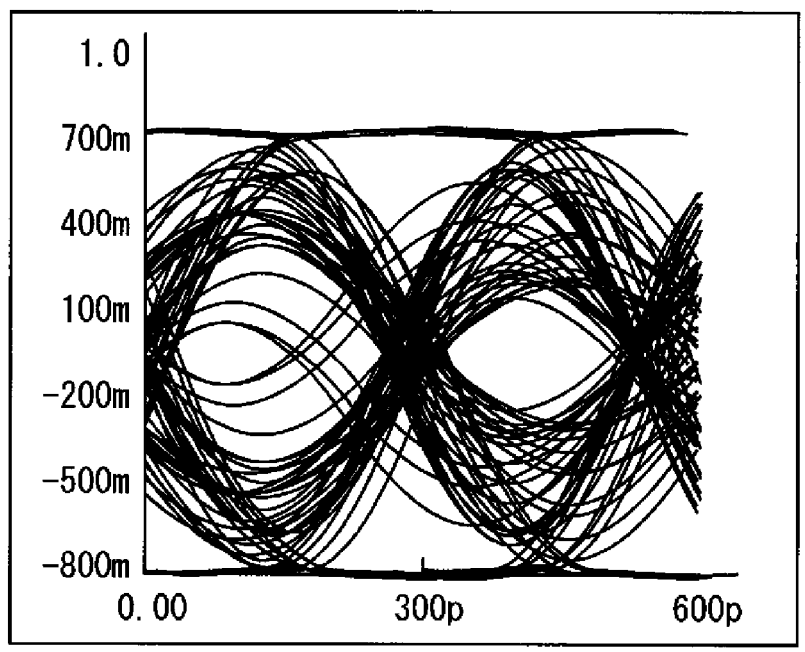
FIG. 6A is a diagram showing an eye opening when the equalizer circuit performs amplification at two levels.
Figure 6B:
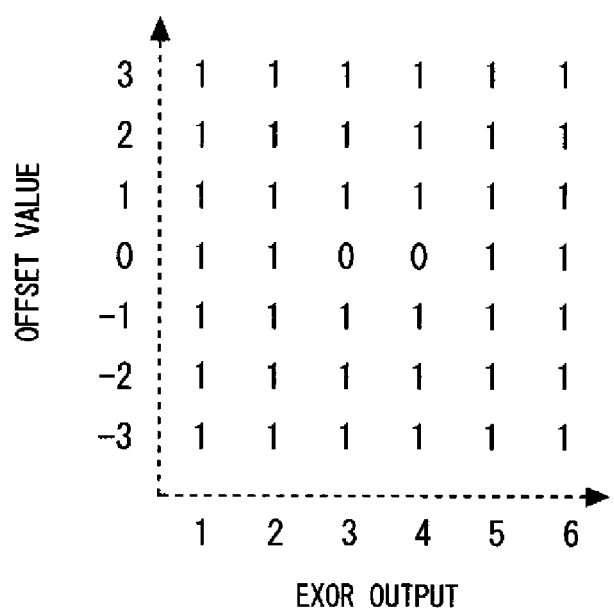
FIG. 6B is a diagram showing matrix information of the eye opening when the equalizer circuit performs amplification at two levels.
Figure 7A:
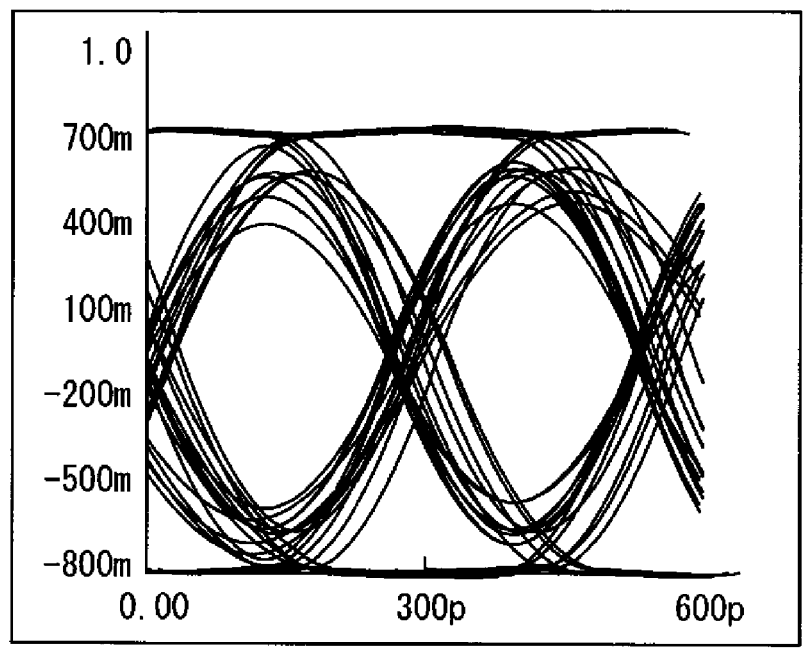
FIG. 7A is a diagram showing an eye opening when the equalizer circuit performs amplification at three levels.
Figure 7B:
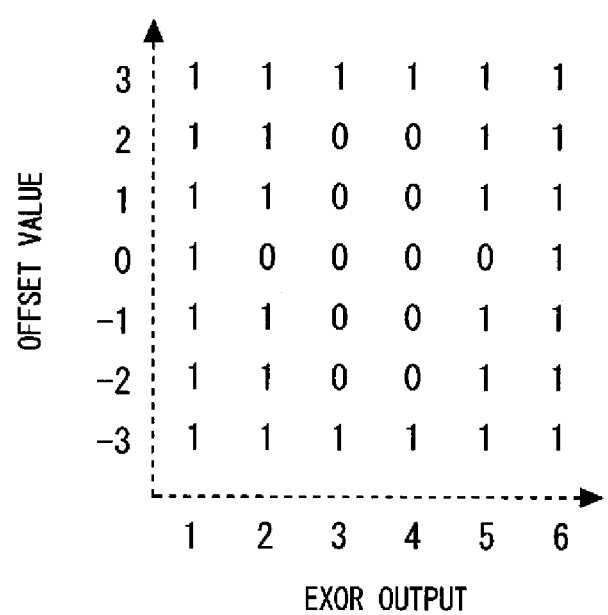
FIG. 7B is a diagram showing matrix information of the eye opening when the equalizer circuit performs amplification at three levels.

In this case, as shown in FIG. 4B, as the number of operation values "0" in the matrix information increases, i.e., as the area including the operation values "0" increases, the eye opening area in the eye diagram of the output signal from the equalizer circuit 1 increases, Meanwhile, as shown in FIG. 3B, as the number of the operation values "0" in the matrix information decreases, i.e., as the area including the operation values "0" decreases, the eye opening area in the eye diagram of the output signal from the equalizer circuit 1 decreases.

Thus, the number of the operations values "0" in the matrix information calculated by the counter circuit 42 is substantially proportional to the eye opening area in the eye diagram of the output signal from the equalizer circuit 1, and indicates area information of the eye opening. The area information calculation circuit 4 outputs the calculated matrix information to the control circuit 5.

The control circuit 5 controls the amplification of the equalizer circuit 1 stepwise based on the matrix information output from the area information calculation circuit 4, i.e., based on the area information of the eye opening.

For example, the control circuit 5 controls the amplification of the equalizer circuit 1 stepwise based on the number of the operation values "0" in the matrix information output from the area information calculation circuit 4 so that the eye opening area in the eye diagram of the output signal from the equalizer circuit 1 is maximized. First, the control circuit 5 controls the amplification of the equalizer circuit 1 to be varied at one to six levels (equalizer set values=1-6). At this time, the area information calculation circuit 4 calculates the matrix information of the eye opening for each amplification level of the equalizer circuit 1, and outputs the calculated matrix information to the control circuit 5. Then, the control circuit 5 compares the numbers of the operation values "0" in the matrix information of the eye opening calculated for each of the one to six amplification levels of the equalizer circuit 1. The control circuit 5 selects an amplification level of the equalizer circuit 1, at which the number of the operation values "0" is maximum and the eye opening area is maximum, in the matrix information of each eye opening. Finally, the control circuit 5 controls the amplification of the equalization circuit 1 at the selected amplification level, and fixes the amplification level.

FIGS. 5A, 6A, 7A, 8A, 9A, and 10A are diagrams each showing an exemplary state of an eye opening at one to six amplification levels of the equalizer circuit. FIGS. 5B, 6B, 7B, 8B, 9B, and 10B are diagrams each showing exemplary matrix information of the eye opening at one to six amplification levels of the equalizer circuit.

Figure 8A:
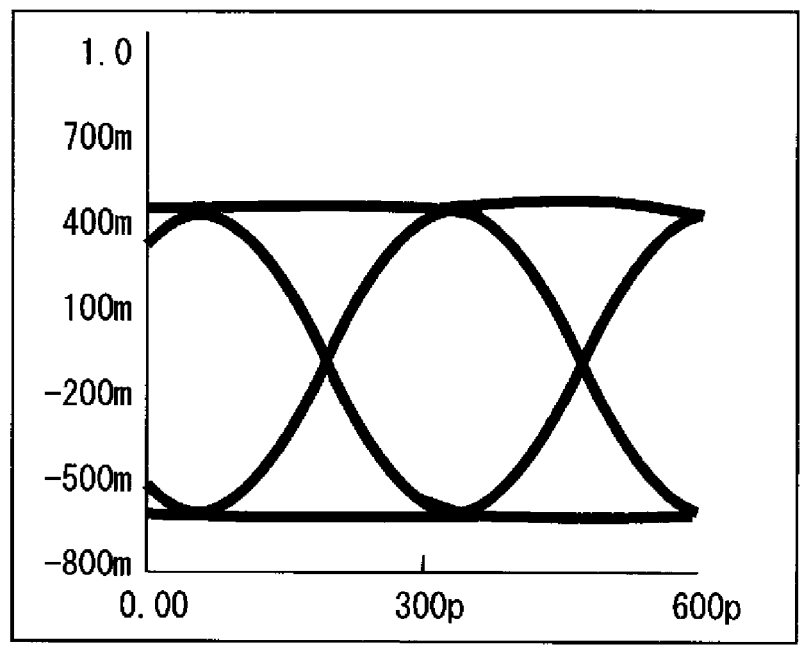
FIG. 8A is a diagram showing an eye opening when the equalizer circuit performs amplification at four levels.
Figure 8B:
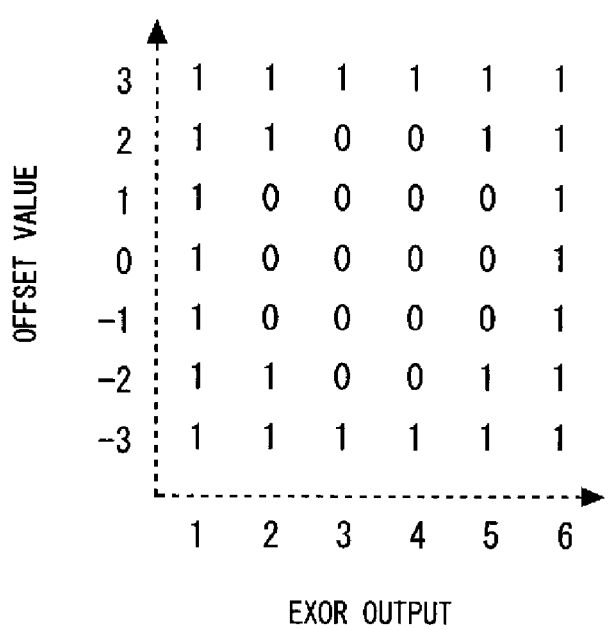
FIG. 8B is a diagram showing matrix information of the eye opening when the equalizer circuit performs amplification at four levels.
Figure 9A:
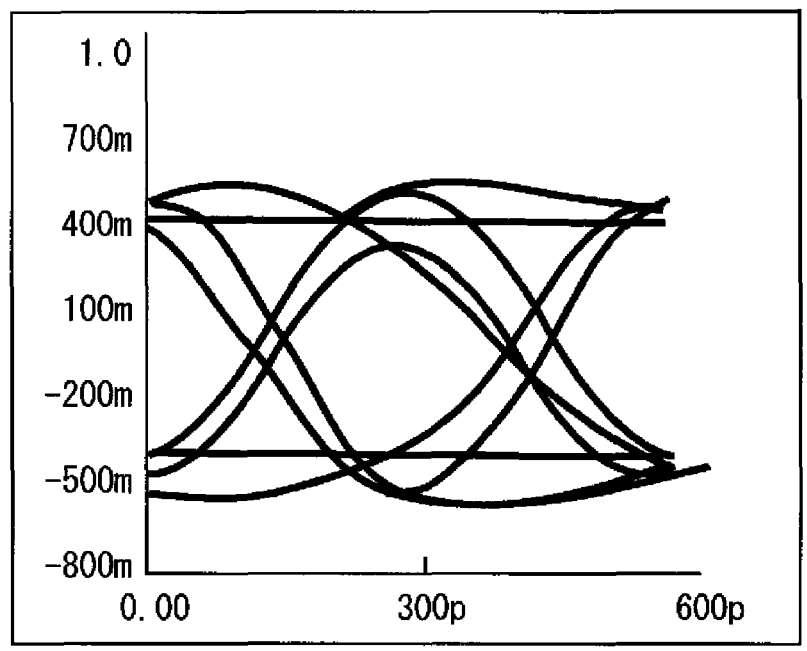
FIG. 9A is a diagram showing an eye opening when the equalizer circuit performs amplification at five levels.
Figure 9B:
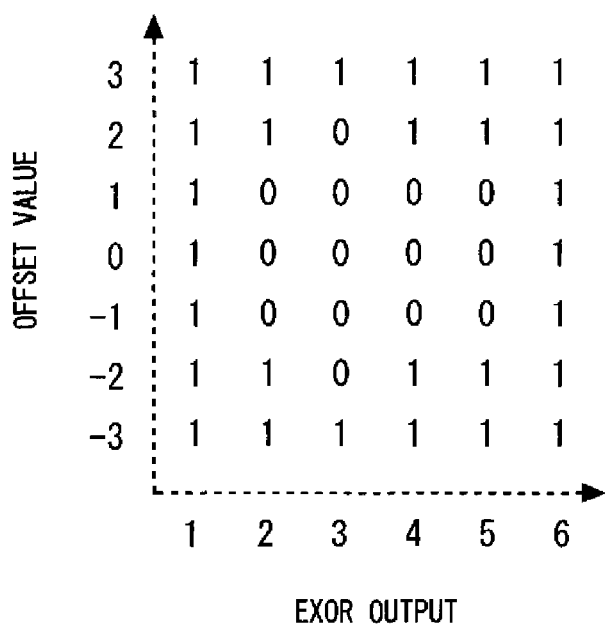
FIG. 9B is a diagram showing matrix information of the eye opening when the equalizer circuit performs amplification at five levels.
Figure 10A:
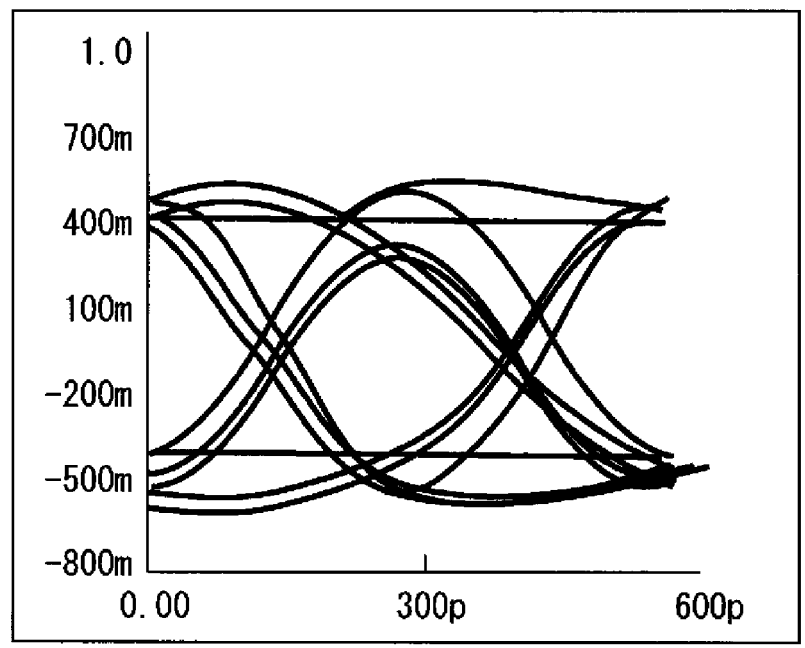
FIG. 10A is a diagram showing an eye opening when the equalizer circuit performs amplification at six levels.
Figure 10B:
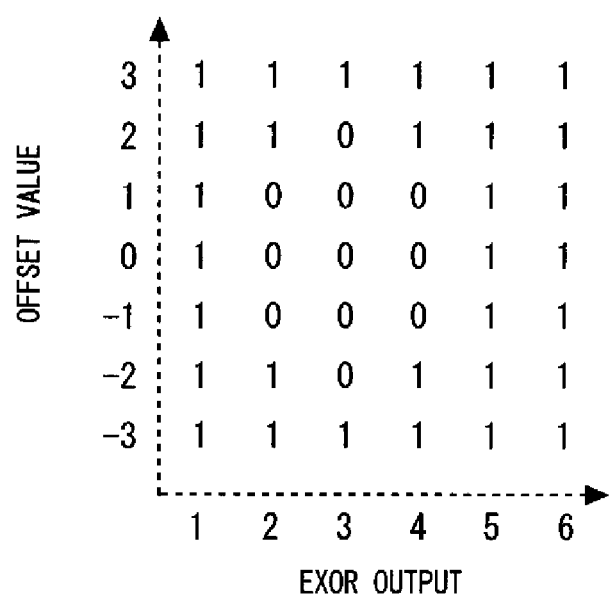
FIG. 10B is a diagram showing matrix information of the eye opening when the equalizer circuit performs amplification at six levels.

In this case, as shown in FIGS. 5B, 6B, 7B, 8B, 9B, and 10B, the numbers of the operation values "0" in the matrix information of the eye opening obtained when the equalizer circuit 1 is caused to perform amplification at one to six levels are 0, 2, 12, 16, 14, and 11. Referring to FIG. 8B, the number of the operation values "0" in the matrix information of the eye opening obtained when the equalizer circuit 1 is caused to perform amplification at four levels is 16. Accordingly, the control circuit 5 selects the amplification at four levels, controls the amplification of the equalizer circuit 1 to be performed at four levels, and fixes the amplification level. Thus, in the signal processing apparatus 10 according to this exemplary embodiment, the eye opening area can be easily depicted using the matrix information including the values "0" and "1", which are obtained by offsetting the output signal stepwise in the amplitude direction by using the multiphase clock system. Further, the amplification of the equalizer circuit 1 can be controlled with high precision at the optimum level where the eye opening area is maximum. Consequently, the eye opening can be optimized with high precision.

Figure 17A:
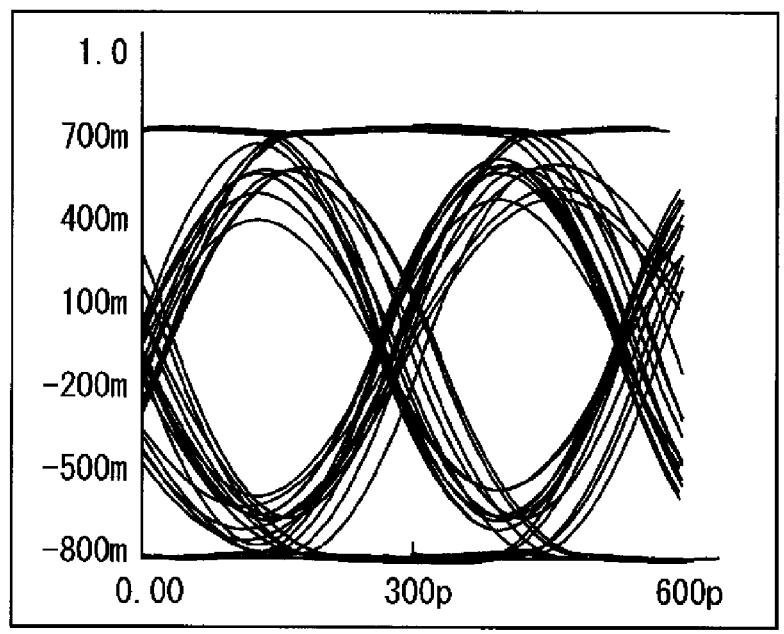
FIG. 17A is a diagram showing an eye opening when the equalizer circuit performs amplification at three levels.
Figure 17B:
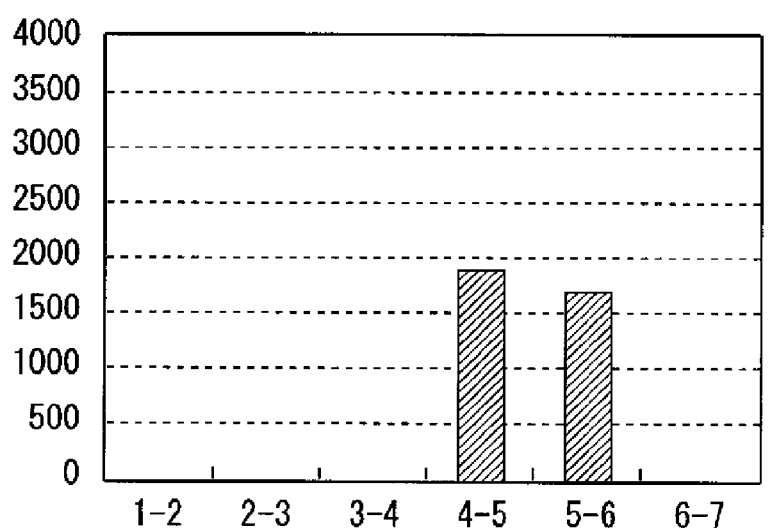
FIG. 17B is a graph showing count results of numbers "1" when the equalizer circuit performs amplification at three levels.
Figure 18A:
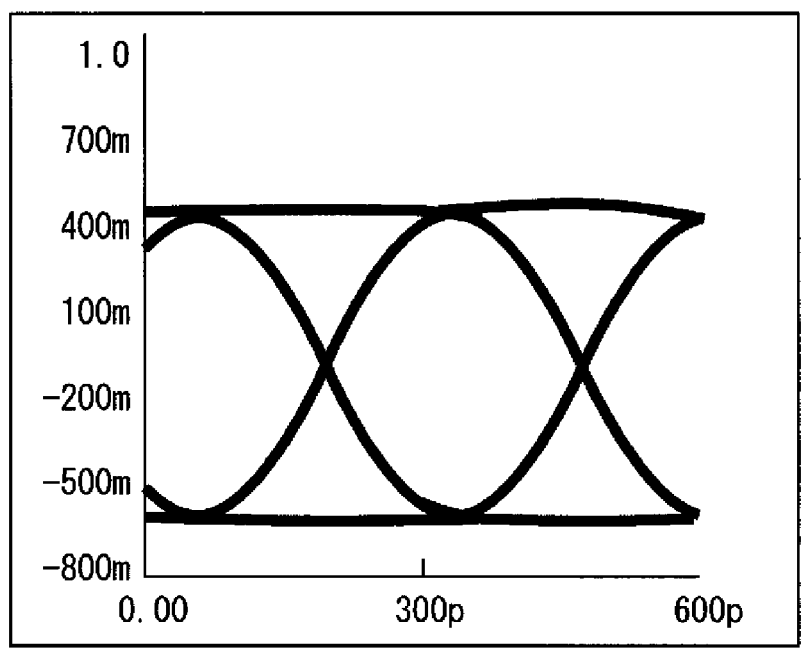
FIG. 18A is a diagram showing an eye opening when the equalizer circuit performs amplification at four levels.
Figure 18B:
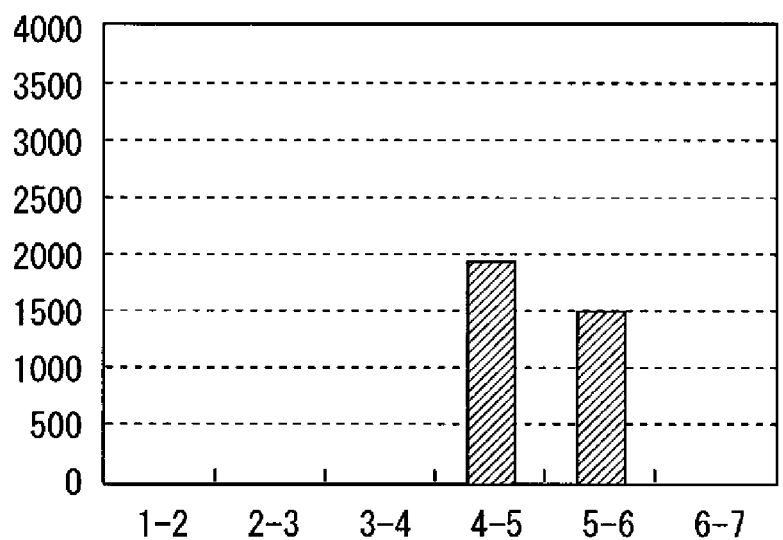
FIG. 18B is a graph showing count results of numbers "1" when the equalizer circuit performs amplification at four levels.
Figure 19A:
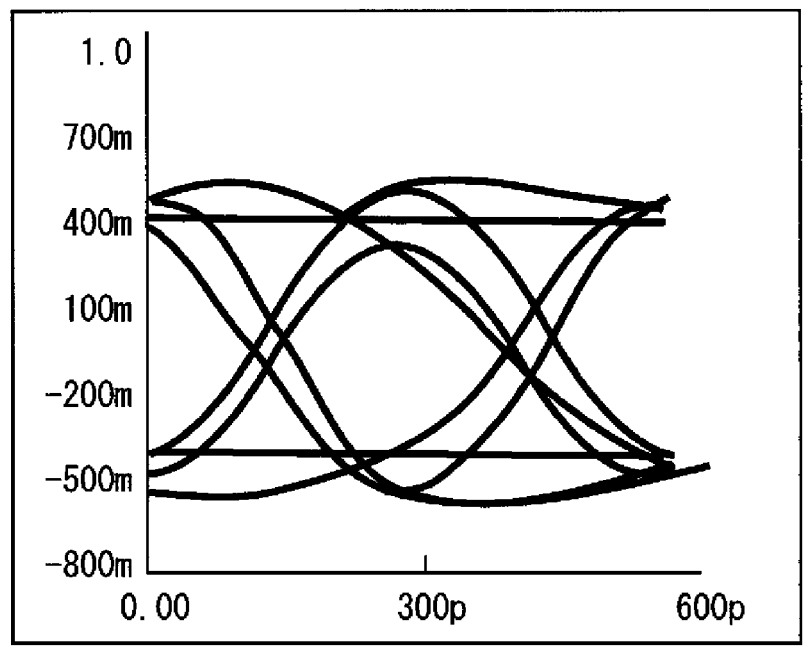
FIG. 19A is a diagram showing an eye opening when the equalizer circuit performs amplification at five levels.
Figure 19B:
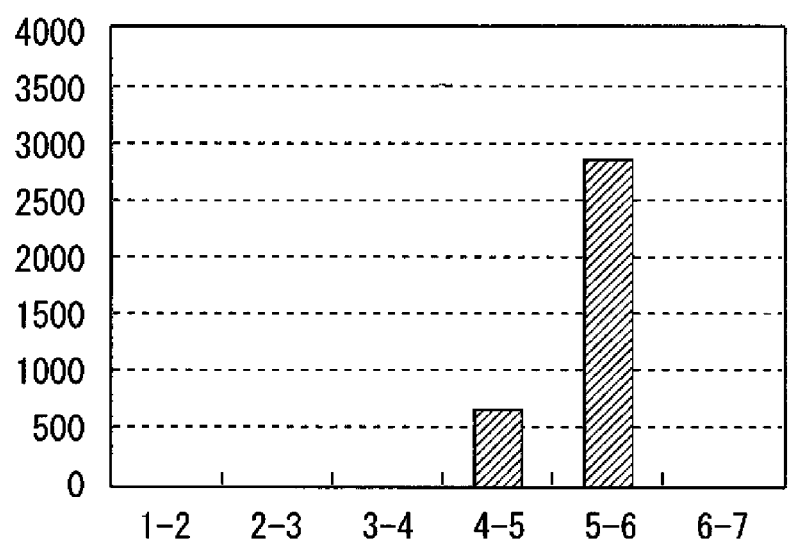
FIG. 19B is a graph showing count results of numbers "1" when the equalizer circuit performs amplification at five levels.
Figure 20A:
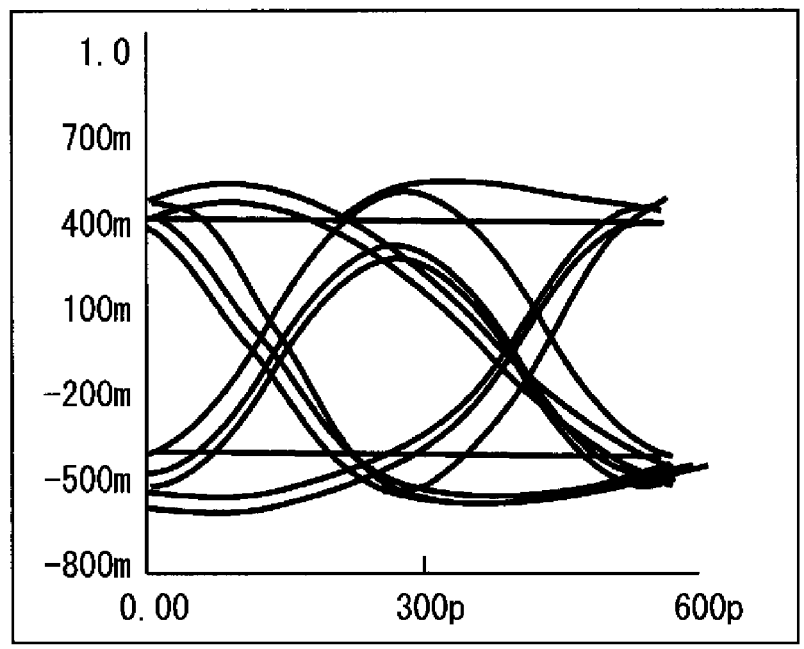
FIG. 20A is a diagram showing an eye opening when the equalizer circuit performs amplification at six levels.
Figure 20B:
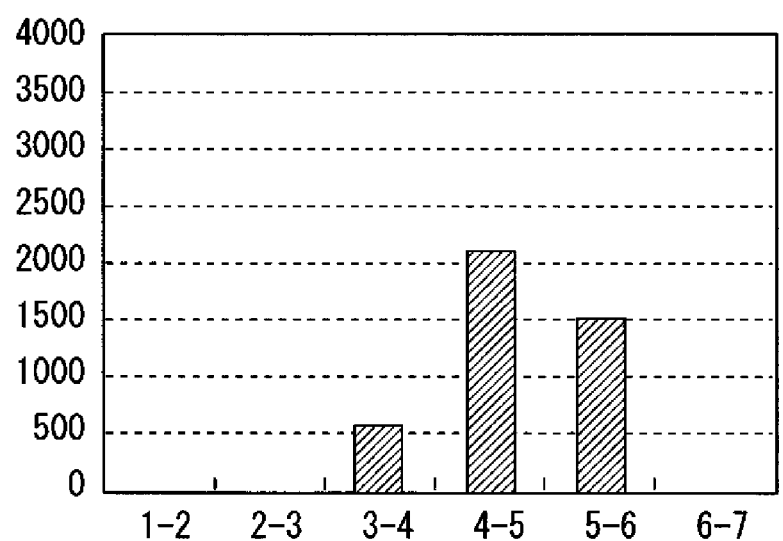
FIG. 20B is a graph showing count results of numbers "1" when the equalizer circuit performs amplification at six levels.

Meanwhile, FIGS. 15B, 16B, 17B, 18B, 19B, and 20B are graphs showing exemplary count results of operation values "1" obtained when an adaptive equalizer circuit according to a related art performs amplification at one to six levels. In the adaptive equalizer circuit, when sampling is performed using the six-phase clock system, for example, jitter characteristics can be detected with a resolution of 60 ps and at a transfer rate of about 3.4 Gbps. However, the eye opening has jitter characteristics of 60 ps or less in the amplification at three to five levels. As a result, the adaptive equalizer circuit may erroneously select the amplification at three levels (FIGS. 17A and 17B) or the amplification at five levels (FIGS. 19A and 19B) instead of the optimum amplification at four levels (FIGS. 18A and 18B), and may fix the selected amplification level. In this case, the adaptive equalizer circuit is more likely to select and fix the amplification at five levels where the number of operation values "1" is largest. Thus, there is a possibility that the adaptive equalizer circuit according to the related art cannot control the amplification of the input signal at the optimum level where the eye opening area is maximum. On the other hand, in the signal processing apparatus 10 according to this exemplary embodiment, even in the case of high-speed signal transmission of about 3.4 Gbps or more, for example, the amplification of the equalizer circuit 1 can be controlled at the optimum level where the eye opening area is maximum, and the eye opening can be optimized with high precision, as described above.

Figure 11:
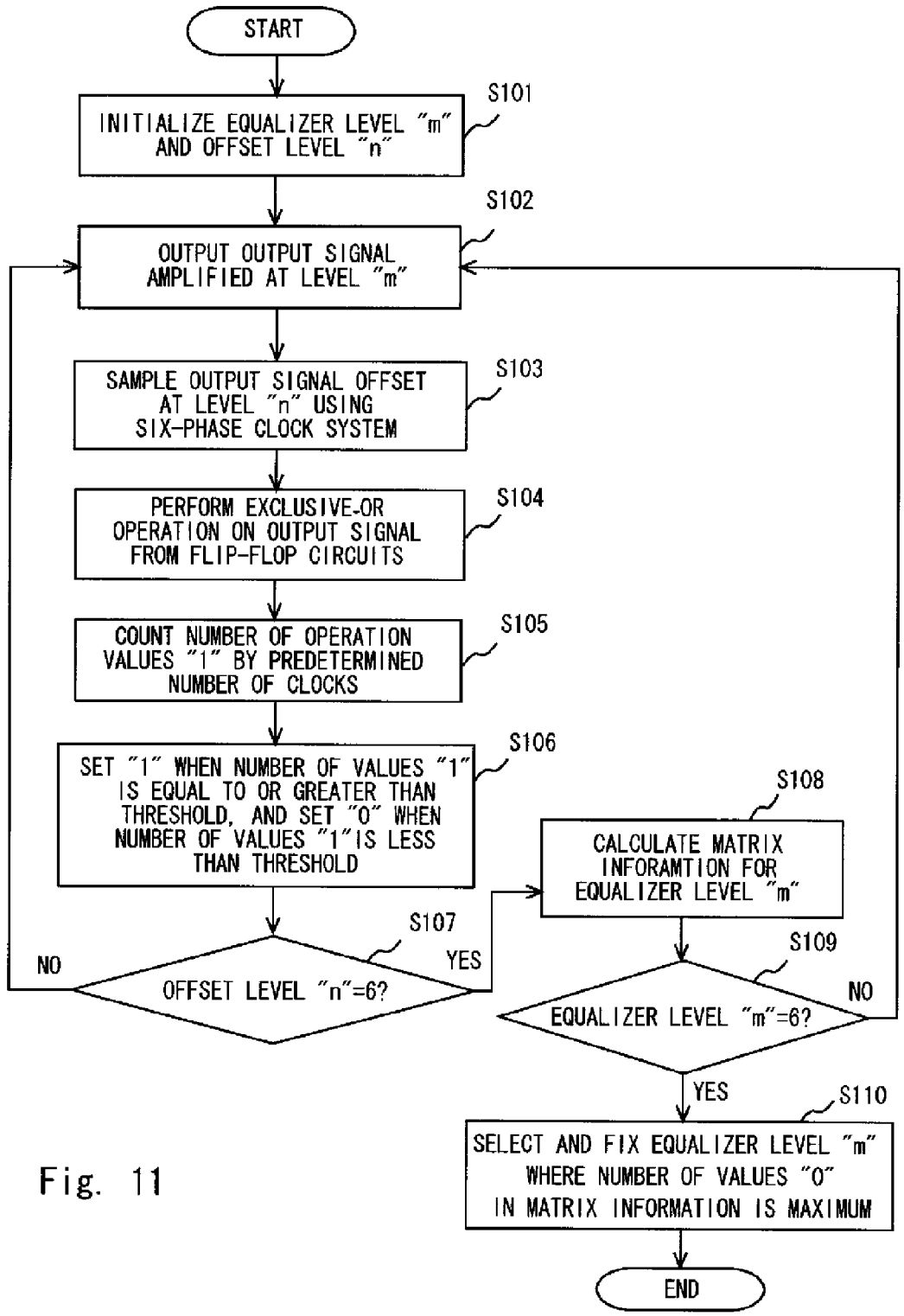
FIG. 11 is a flowchart showing an exemplary processing flow of a signal processing apparatus according to an exemplary embodiment of the present invention.
Figure 12:
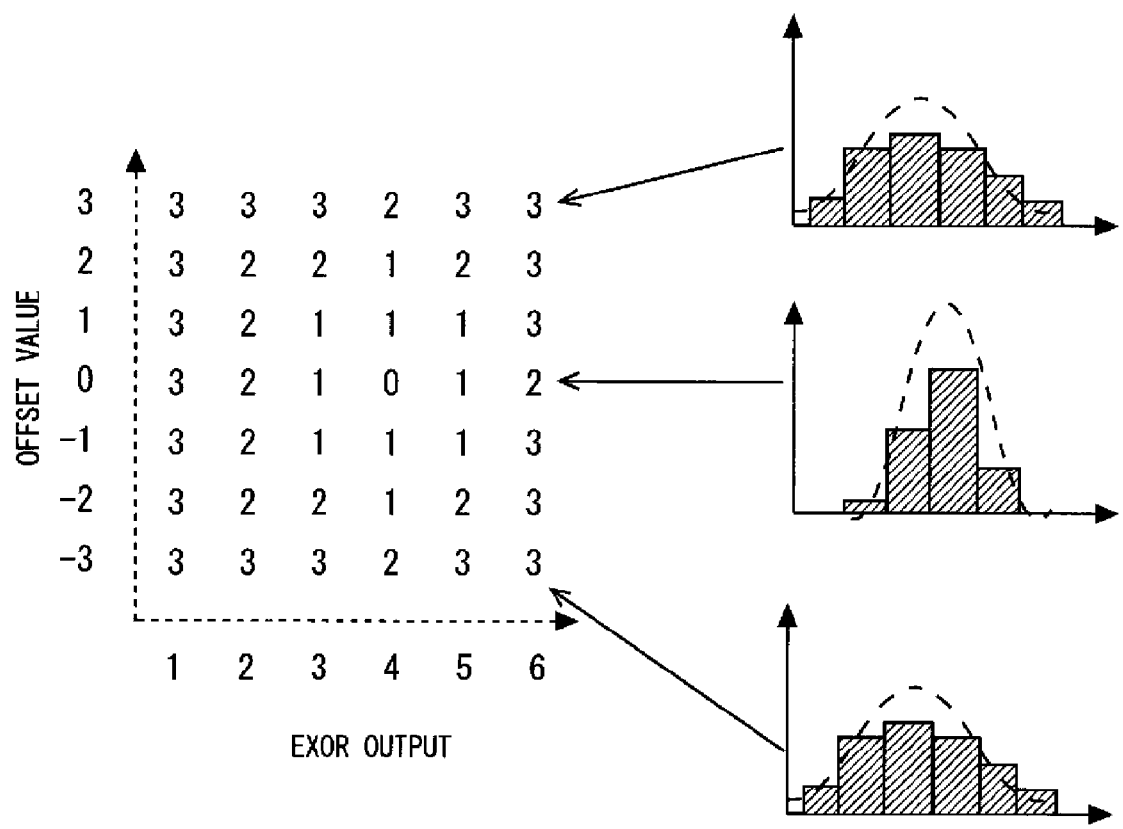
FIG. 12 is a diagram showing matrix information of an eye opening in an eye diagram of an output signal from an equalizer circuit according to another exemplary embodiment of the present invention.
Figure 13A:
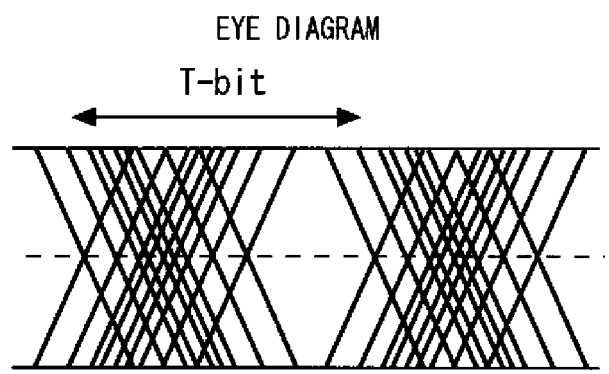
FIG. 13A is a diagram showing an eye opening in the eye diagram of the output signal from the equalizer circuit.
Figure 13B:
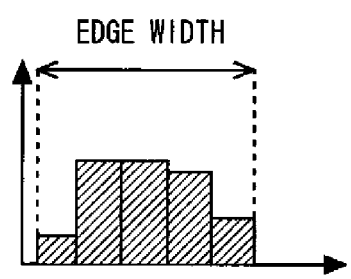
FIG. 13B is a diagram showing count results of numbers "1" in an adaptive equalizer circuit according to a related art.
Figure 14A:
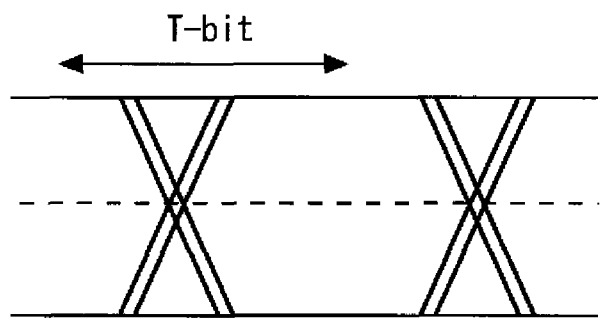
FIG. 14A is a diagram showing an eye opening in the eye diagram of the output signal from the equalizer circuit.
Figure 14B:
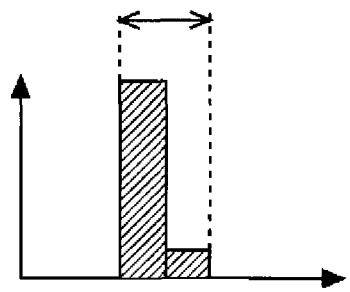
FIG. 14B is a diagram showing count results of numbers "1" in the adaptive equalizer circuit according to the related art.
Figure 15A:
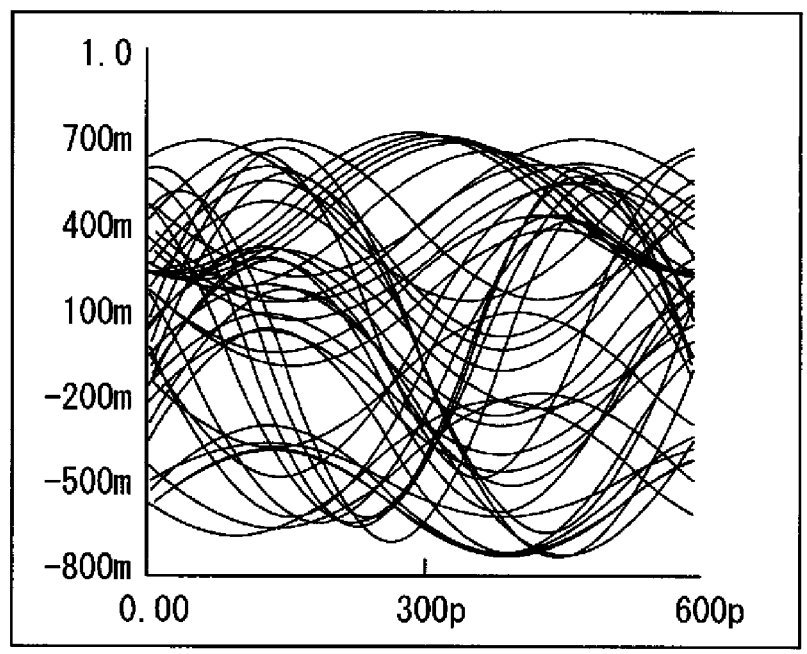
FIG. 15A is a diagram showing an eye opening when the equalizer circuit performs amplification at one level.
Figure 15B:
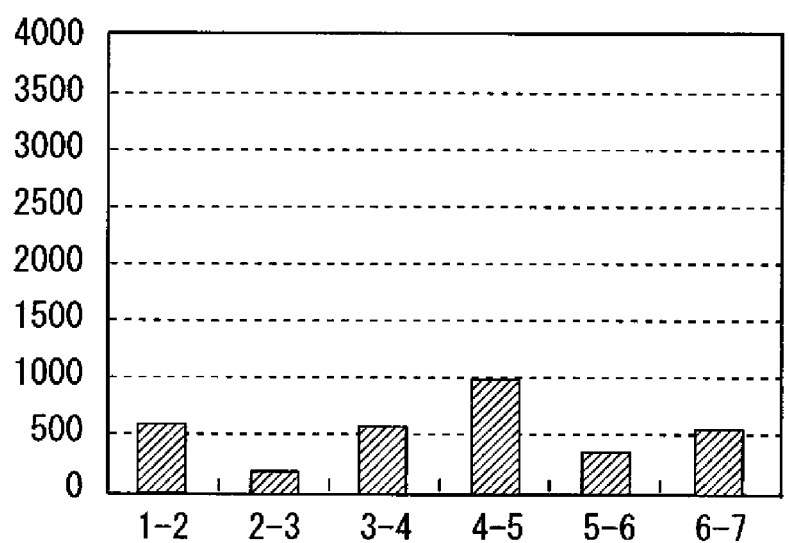
FIG. 15B is a graph showing count results of the numbers "1" when the equalizer circuit performs amplification at one level.
Figure 16A:
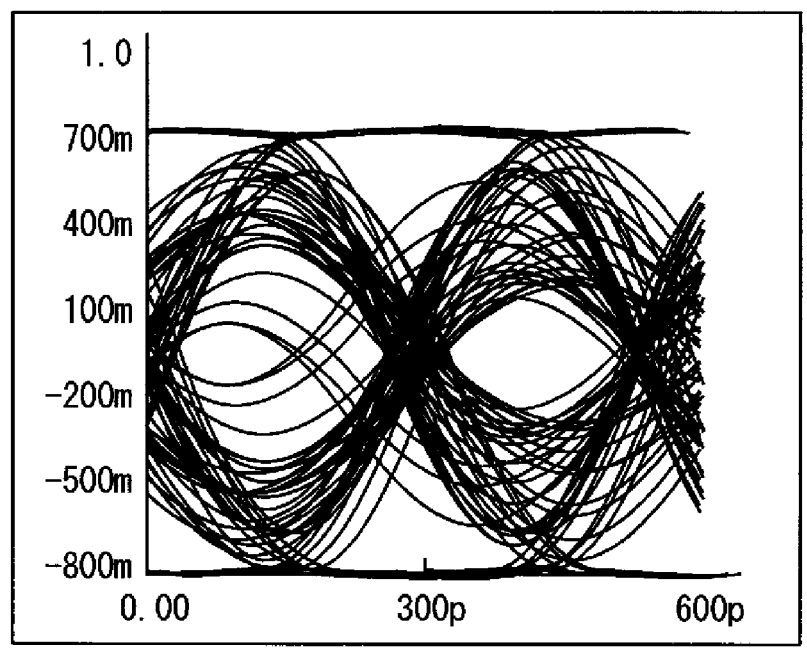
FIG. 16A is a diagram showing an eye opening when the equalizer circuit performs amplification at two levels.
Figure 16B:
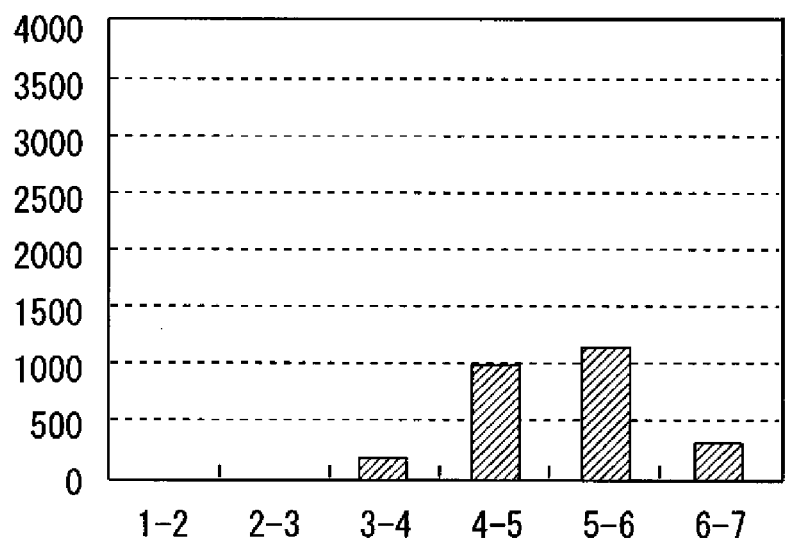
FIG. 16B is a graph showing count results of numbers "1" when the equalizer circuit performs amplification at two levels.

FIG. 11 is a flowchart showing an exemplary processing flow of the signal processing apparatus according to this exemplary embodiment.

First, "1" (m=1) is initially set as an equalizer level "m" of the control circuit 5, and "1" (n=1) is initially set as an offset level "n" of the offset generation circuit 3 (step S101).

The equalizer circuit 1 outputs the output signal obtained by amplifying the input signal at the "m" level based on the equalizer level "m" from the control circuit 5 (step S102).

Each of the flip-flop circuits 21 of the sampler circuit 2 samples the output signal output from the equalizer circuit 1 with the output signals being offset at the "n" level in the amplitude direction using the six-phase clock system based on the offset level "n" (step S103), and outputs the output signal ("0" or "1") to each of the EX-OR circuits 41 of the area information calculation circuit 4.

Each of the EX-OR circuits 41 performs an exclusive-OR operation using two output signals output from two adjacent flip-flop circuits 21 (step S104), and outputs the operation value "0" or "1" to the counter circuit 42.

The counter circuit 42 counts the number of the operation values "1", which are output from the EX-OR circuits 41, for each of the six EX-OR circuits 41, and stores the count values in a register. For example, the counter circuit 42 counts the number of the operation values "1", which are output from the EX-OR circuits 41, by the predetermined number of clocks (step S105). Then, the counter circuit 42 sets "1" as the count value when the number of the operation values "1" is equal to or greater than the threshold S, and sets "0" as the count value when the number of the operation values "1" is less than the threshold S, and then stores the count values in the registers (step S106).

The offset generation circuit 3 determines whether the offset level "n" is 7 (n=7) (step S107). When the offset generation circuit 3 determines that the offset level "n" is 7 (YES in step S107), the counter circuit 42 calculates matrix information for the equalizer level "m" (step S108) and outputs the calculated matrix information to the control circuit 5. Then, the flow shifts to step S109. Meanwhile, when the offset generation circuit 3 determines that the offset level "n" is not 7 (NO in step S107), the offset level "n" is incremented (n=n+1). Then, the flow shifts to step S102.

The control circuit 5 determines whether the equalizer level "m" is 6 (m=6) (step S109). When the control circuit 5 determines that the equalizer level "m" is 6 (YES in step S109), the flow shifts to step S110. Meanwhile, when the control circuit 5 determines that the equalizer level "m" is not 6 (NO in step S109), the equalizer level "m" is incremented (m=m+1). Then, the flow shifts to step S102.

The control circuit 5 selects the equalizer level "m" where the number of the value "0" is maximum in the matrix information of each equalizer level "m" output from the counter circuit 42 of the area information calculation circuit 4 (step S110). Finally, the control circuit 5 controls the amplification of the equalizer circuit 1 at the selected equalizer level "m" and fixes the equalizer level.

As described above, in the signal processing apparatus 10 according to this exemplary embodiment, the sampler circuit 2 samples the output signal output from the equalizer circuit 1 with the output signal being offset stepwise in the amplitude direction using the multiphase clock system, and outputs the output signal ("0" or "1") to the area information calculation circuit 4. The area information calculation circuit 4 calculates the matrix information serving as the area information of the eye opening, based on the output signal from the sampler circuit 2. Then, the control circuit 5 controls the amplification of the equalizer circuit 1 at the level where the number of the operation values "0" in the matrix information of the eye opening calculated by the area information calculation circuit 4 is maximum, i.e., the eye opening area is maximum. As a result, the amplification of the equalizer circuit 1 can be controlled at the optimum level where the eye opening area is maximum. In other words, the eye opening in the eye diagram of the output signal from the equalizer circuit 1 can be optimized with high precision.

Note that the present invention is not limited to the exemplary embodiments described above, and various modifications can be made without departing from the scope of the present invention.

For example, in the above exemplary embodiments, the control circuit 5 may control the threshold S of the counter circuit 42. This makes it possible to improve the precision for detecting an eye opening. Further, the counter circuit 42 may calculate a standard deviation σ from a number of histograms corresponding to the number of the operation values "1", which are output from the EX-OR circuits 41, so that an eye opening has a gradient of a bit error rate (BER).

Moreover, in the above exemplary embodiments, the present invention has been implemented as a hardware configuration, but the present invention is not limited thereto. According to the present invention, arbitrary processing can be performed by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

The whole or part of the exemplary embodiments disclosed above can be described as, but not limited to, the following supplement note.

(Supplement note 1) A non-transitory computer readable media that stores a signal processing program that causes a computer to execute processing including: amplifying a predetermined frequency band of an input signal and outputting an output signal; sampling the amplified output signal with the output signal being offset in an amplitude direction using a multiphase clock system; calculating area information of an eye opening in an eye diagram of the output signal based on the sampled output signal; and controlling the amplification based on the calculated area information of the eye opening.

What is claimed is:

1. A signal processing apparatus comprising:
equalizer means that amplifies a predetermined frequency band of an input signal and outputs an output signal;
sampler means that samples the output signal amplified by the equalizer means with the output signal being offset in an amplitude direction using a multiphase clock system;
area information calculation means that calculates area information of an eye opening in an eye diagram of the output signal based on the output signal sampled by the sampler means; and
control means that controls amplification of the equalizer means stepwise based on the area information of the eye opening calculated by the area information calculation means so that the area of the eye opening calculated by the area information calculation means is maximized.

2. The signal processing apparatus according to claim 1, wherein
the sampler means includes a plurality of flip-flop circuits that sample the output signal with the output signal being offset stepwise in the amplitude direction using the multiphase clock system, and
the area information calculation means includes:
a plurality of exclusive-OR circuits that perform an exclusive-OR operation based on output signals output from the plurality of flip-flop circuits; and
a counter circuit that counts the number of operation values output from the plurality of exclusive-OR circuits for each level of the offsetting, and calculates matrix information serving as the area information of the eye opening.

3. The signal processing apparatus according to claim 2, wherein the counter circuit sets a first predetermined value to an element corresponding to the matrix information when the number of the operation values is equal to or greater than a threshold, and sets a second predetermined value to an element corresponding to the matrix information when the number of the operation values is less than the threshold.

4. The signal processing apparatus according to claim 3, wherein
the counter circuit calculates the matrix information for each level of the amplification by the equalizer means, and
the control means controls the amplification of the equalizer means at a level where the number of the second predetermined values is maximum in the matrix information for each level of the amplification by the equalizer means.

5. The signal processing apparatus according to claim 1, wherein the sampler means samples the output signal with the output signal being offset at seven levels in the amplitude direction using a six-phase clock system.

6. A signal processing method comprising:
amplifying a predetermined frequency band of an input signal and outputting an output signal;
sampling the amplified output signal with the output signal being offset in an amplitude direction using a multiphase clock system;
calculating area information of an eye opening in an eye diagram of the output signal based on the sampled output signal;
controlling the amplification based on the calculated area information of the eye opening;
sampling the amplified output signal with the output signal being offset stepwise in the amplitude direction using the multi-phase clock system; and
performing an exclusive-OR operation based on the sampled output signal, and counting the number of operation values obtained by the exclusive-OR operation for each level of the offsetting, to calculate matrix information serving as the area information of the eye opening.

* * * * *